US012236221B2

(12) United States Patent
Bursell (10) Patent No.: US 12,236,221 B2
(45) Date of Patent: Feb. 25, 2025

(54) SOFTWARE PROVISIONING AGENT RESIDING IN TRUSTED EXECUTION ENVIRONMENT

(71) Applicant: Red Hat, Inc., Raleigh, NC (US)

(72) Inventor: Michael Hingston Mclaughlin Bursell, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 707 days.

(21) Appl. No.: 16/668,817

(22) Filed: Oct. 30, 2019

(65) Prior Publication Data

US 2021/0132925 A1  May 6, 2021

(51) Int. Cl.
| | |
|---|---|
| *G06F 8/60* | (2018.01) |
| *G06F 9/54* | (2006.01) |
| *G06F 21/60* | (2013.01) |
| *H04L 9/08* | (2006.01) |
| *H04L 9/32* | (2006.01) |

(52) U.S. Cl.
CPC ............... *G06F 8/60* (2013.01); *G06F 9/54* (2013.01); *G06F 21/602* (2013.01); *H04L 9/0861* (2013.01); *H04L 9/321* (2013.01)

(58) Field of Classification Search
CPC . G06F 8/60; G06F 9/54; G06F 21/602; H04L 9/0861; H04L 9/321
See application file for complete search history.

(56) References Cited

U.S. PATENT DOCUMENTS

| | | | | |
|---|---|---|---|---|
| 6,802,061 | B1 * | 10/2004 | Parthasarathy | ........... G06F 8/60 717/173 |
| 8,005,227 | B1 | 8/2011 | Linnell et al. | |
| 8,886,933 | B1 * | 11/2014 | Poiesz | ................... H04W 12/37 705/40 |
| 8,972,746 | B2 | 3/2015 | Johnson | |
| 9,317,708 | B2 | 4/2016 | Lee | |
| 9,380,036 | B2 | 6/2016 | Parann-Nissany | |
| 9,432,184 | B2 | 8/2016 | Zheng | |
| 9,830,278 | B1 | 11/2017 | Harwood | |

(Continued)

FOREIGN PATENT DOCUMENTS

| | | | | |
|---|---|---|---|---|
| WO | WO-2017084555 | A1 * | 5/2017 | ............. G06F 21/51 |
| WO | 2019021105 | A1 | 1/2019 | |

OTHER PUBLICATIONS

Scerri, Guillaume, "Analysis of Key Wrapping APIs: Generic Policies", Computational Security; IEEE 2016; pp. 283-295.

(Continued)

*Primary Examiner* — Michael R Vaughan
*Assistant Examiner* — Ethan V Vo
(74) *Attorney, Agent, or Firm* — Womble Bond Dickinson (US) LLP (57) ABSTRACT

Systems and methods for implementing a software provisioning agent residing in a trusted execution environment. An example method comprises: receiving, by a software provisioning agent residing in a trusted execution environment (TEE) of a host computer system, a software provisioning command initiated by a software provisioning controller, wherein the software provisioning command identifies a target software application; receiving a file associated with the target software application; and performing, using the file, a software provisioning operation with respect to the target software application.

18 Claims, 9 Drawing Sheets

(56) References Cited

U.S. PATENT DOCUMENTS

| | | | |
|---|---|---|---|
| 9,882,902 | B2 | 1/2018 | Chastain et al. |
| 9,967,092 | B2 | 5/2018 | Henry et al. |
| 10,063,372 | B1 | 8/2018 | Chiu et al. |
| 10,325,118 | B2 | 6/2019 | Chhabra et al. |
| 10,657,071 | B2 | 5/2020 | Durham et al. |
| 10,977,021 | B2* | 4/2021 | Li .................... H04L 67/34 |
| 2006/0184802 | A1* | 8/2006 | Ibrahim ............ G06F 21/10 |
| | | | 713/189 |
| 2006/0218400 | A1 | 9/2006 | Kimmel et al. |
| 2008/0114993 | A1 | 5/2008 | Shankar et al. |
| 2008/0276301 | A1* | 11/2008 | Nataraj ............ G06F 8/60 |
| | | | 726/3 |
| 2009/0099864 | A1* | 4/2009 | Cronrath .......... G06F 8/60 |
| | | | 705/2 |
| 2009/0300758 | A1* | 12/2009 | Hauck ............. H04L 9/3271 |
| | | | 380/283 |
| 2012/0030512 | A1* | 2/2012 | Wadhwa .......... H04L 67/62 |
| | | | 714/E11.138 |
| 2013/0129086 | A1* | 5/2013 | Tang ................ G06Q 20/1235 |
| | | | 380/44 |
| 2013/0246812 | A1 | 9/2013 | Resch et al. |
| 2014/0137230 | A1* | 5/2014 | Benari ............. H04L 41/0806 |
| | | | 726/12 |
| 2015/0052369 | A1 | 2/2015 | Koning et al. |
| 2015/0294122 | A1* | 10/2015 | Verma ............. G06F 21/128 |
| | | | 713/193 |
| 2016/0057619 | A1* | 2/2016 | Lopez ............. H04W 12/041 |
| | | | 380/247 |
| 2016/0154963 | A1 | 6/2016 | Kumar et al. |
| 2016/0260095 | A1 | 9/2016 | Ford |
| 2016/0267280 | A1 | 9/2016 | Mansour et al. |
| 2016/0315917 | A1 | 10/2016 | Smith et al. |
| 2016/0350534 | A1 | 12/2016 | Poornachandran et al. |
| 2016/0379212 | A1 | 12/2016 | Bowman et al. |
| 2017/0034643 | A1* | 2/2017 | Young ............... H04W 4/60 |
| 2017/0111331 | A1 | 4/2017 | Auradkar et al. |
| 2017/0180391 | A1* | 6/2017 | Hinchliffe ........ H04W 12/10 |
| 2017/0250814 | A1* | 8/2017 | Brickell ............ H04W 12/37 |
| 2017/0359374 | A1 | 12/2017 | Smith et al. |
| 2018/0097809 | A1* | 4/2018 | Chakrabarti ..... H04L 67/10 |
| 2018/0101677 | A1 | 4/2018 | Broumas et al. |
| 2018/0124064 | A1 | 5/2018 | Schrecker et al. |
| 2018/0176775 | A1 | 6/2018 | Obaidi |
| 2018/0198618 | A1* | 7/2018 | Park ................. H04L 63/06 |
| 2018/0287915 | A1 | 10/2018 | Smith et al. |
| 2018/0367311 | A1 | 12/2018 | Stahlberg et al. |
| 2019/0042766 | A1 | 2/2019 | Pappachan |
| 2019/0044794 | A1* | 2/2019 | Chew ............... H04L 41/0672 |
| 2019/0180047 | A1 | 6/2019 | Matetic et al. |
| 2019/0394024 | A1 | 12/2019 | Vepa et al. |
| 2020/0067701 | A1 | 2/2020 | Abadir et al. |
| 2020/0145199 | A1 | 5/2020 | Kounavis et al. |
| 2020/0266999 | A1 | 8/2020 | Schwarz |
| 2021/0044972 | A1 | 2/2021 | Murray |
| 2021/0091934 | A1 | 3/2021 | Fletcher |
| 2021/0173948 | A1 | 6/2021 | Roth et al. |

OTHER PUBLICATIONS

Rubinov, Konstantin, et al., "Automated Partitioning of Android Applications for Trusted Execution Environments"; IEEE:2016; pp. 923-933.

Ning, Zhenyu et al., Department of Computer Science, Wayne State University Detroit, Michigan, USA; Department of Computer Science, University of Houston, Texas, "Position Paper: Challenges Towards Securing Hardware-Assisted Execution Environments", http://www.cs.wayne.edu/~weisong/papers/ning17-tee.pdf, Jun. 25, 2017, 24 pages.

Jang, Jinsoo et al., Graduate School of Information Security, Korea Advanced Institute of Science and Technology, "SeCReT: Secure Channel between Rich Execution Environment and Trusted Execution Environment", https://pdfs.semanticscholar.org/7b14/f0874dc428305fc5be293086f6c20874ec0b.pdf, Feb. 2015, 15 pages.

Atamli-Reineh, Ahmad, Department of Computer Science, University of Oxford; Department of Computer Science,Aalto University; Department of Computer Science and Engineering, Pennsylvania State University, "A Framework for Application Partitioning using Trusted Execution Environments", https://ora.ox.ac.uk/objects/uuid:8f01389d-1fa8-4771-917c-750fa65bbdee/download_file?file_format=application/pdf&safe_filename=A_Framework_for_Application_Partitioning_using_Trusted_Execution_Environments_Concurrency_and_Computation.pdf, Jan. 2016, 23 pages.

Wang, Wenbo, et al., "A Survey on Consensus Mechanisms and Mining Strategy Management in Blockchain Networks", https://arxiv.org/pdf/1805.02707.pdf, Feb. 19, 2019, 40 pages.

Zhang et al., USENIX Security, "REM: Resource-Efficient Mining for Blockchains", https://blog.acolyer.org/2017/09/06/rem-resource-efficient-mining-for-blockchains/, Sep. 6, 2017, 7 pages.

Liang, Hongliang, et al., Beijing University of Posts and Telecommunications, "Aurora: Providing Trusted System Services for Enclaves on an Untrusted System", https://arxiv.org/pdf/1802.03530.pdf, Feb. 10, 2018, 14 pages.

Amazon Web Services, Inc, "Performing a Proof of Concept with Amazon Aurora", https://docs.aws.amazon.com/AmazonRDS/latest/AuroraUserGuide/aurora-poc.html, 2019, 17 pages.

Alder, Fritz, et al., Aalto University; Intel Labs, "S-FaaS: Trustworthy and Accountable Function-as-a-Service using Intel SGX", https://arxiv.org/pdf/1810.06080.pdf, Oct. 14, 2018, 16pages.

Castor, Amy, "A (Short) Guide to Blockchain Consensus Protocols", https://www.coindesk.com/short-guide-blockchain-consensus-protocols, Mar. 4, 2017, 18 pages.

Zhang et al., Cornell University, Cornell Tech, "REM: Resource-Efficient Mining for Blockchains", http://pages.cpsc.ucalgary.ca/~joel.reardon/blockchain/readings/sec17-zhang.pdf, Aug. 16-18, 2017, 19 pages.

Matthew Arena; Securing Trusted Execution Environments with PUF Generated Secret Keys; IEEE:2012; p. 1188-1193.

* cited by examiner

SOFTWARE PROVISIONING AGENT RESIDING IN TRUSTED EXECUTION ENVIRONMENT

TECHNICAL FIELD

The present disclosure is generally related to cloud computing, and is more specifically related to implementing a software provisioning agent residing in a trusted execution environment.

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity and measured service. The cloud computing model comprises several service models, including Software as a Service (SaaS), Platform as a Service (PaaS), and Infrastructure as a Service (IaaS). The cloud computing model may be implemented according to one of the several deployment models, including private cloud, community cloud, public cloud and hybrid cloud.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for implementing a software provisioning agent residing in a trusted execution environment (TEE).

An example cloud environment may include one or more host computer systems running multiple centrally managed virtual machines. One of the important administrative tasks with respect to cloud environments is performing software provisioning tasks (e.g., installations and/or updates) on the virtual machines. Should the security of a host computer system become compromised by a malicious party, such a malicious party would be able to tamper with the software updates applied to the host itself, as well as to various applications and components running on the host, such as virtual machines, containers, etc.

The present disclosure alleviates these and other deficiencies of various common implementations by providing methods and systems for implementing TEE-resident software provisioning agents. In an illustrative example, software provisioning activities in the cloud environment may be managed by a software provisioning controller, which may communicate to software provisioning agents installed on each host. Each software provisioning agent may be implemented by one or more executable code modules, which may expose one or more software provisioning application programming interface (API) functions that may be invoked by the local host and/or the software provisioning controller.

For improved security, each software provisioning agent may run in a TEE on the respective host computer system. In an illustrative example, the TEE may be implemented by an Intel® Software Guard Extensions (SGX) secure enclave, which is a private region of encrypted memory, the contents of which would only be decrypted for access by the process running within the enclave. In another illustrative example, the TEE may be implemented by the AMD® Secure Encrypted Virtualization (SEV), which encrypts the memory state of each virtual machine using a respective encryption key inaccessible by other virtual machines. Various other TEE implementations for the above-referenced and/or other processor architectures may be compatible with the systems and methods of the present disclosure.

Each TEE-resident software provisioning agent may securely communicate with the software provisioning controller in order to perform various software provisioning operations (e.g., software installation and/or update operations) on the local host. In an illustrative example, a software provisioning operation may be initiated by the software provisioning controller, which may transmit a software provisioning command to one or more software provisioning agents residing on the respective hosts. In another illustrative example, a software provisioning operation may be initiated by the software provisioning agent transmitting a request to the software provisioning controller. In another illustrative example, a software provisioning operation may be initiated by a host computer system and/or by a virtual machine running on the host computer system, which may invoke a function of the software provisioning API implemented by the software provisioning agent.

Upon initiating the software provisioning operation, the software provisioning agent may receive one or more files containing the code and/or metadata for performing the software provisioning operation. In an illustrative example, the files may be retrieved from the software provisioning controller. Alternatively, the software provisioning controller may supply, to the software provisioning agent, one or more file identifiers (e.g., uniform resource identifiers (URI)) for retrieving one or more files from a software repository.

In some implementations, the files may be encrypted, e.g., by a private key of the software provisioning controller.

Upon retrieving the necessary files, the software provisioning agent may decrypt them using the public key of the software provisioning controller. Various other encryption schemes may be implemented by the systems and methods of the present disclosure.

In some implementations, a transport layer security scheme (e.g., secure socket layer (SSL)) may be implemented for secure data and command transmission between the software provisioning controller, software provisioning agents, and/or one or more software repositories.

Upon receiving and decrypting the files, the software provisioning agent may perform the software provisioning operation (e.g., software installation or update operation). In an illustrative example, the software provisioning agent may invoke one or more functions of the software provisioning API implemented by the host computer system and/or by virtual machines running on the host computer system. Alternatively, the software provisioning agent may directly perform one or more file system operations on the host, e.g., by invoking one or more functions of the file system API implemented by the host computer system. Various other methods of performing software provisioning operations may be implemented by the systems and methods of the present disclosure.

In some implementations, the software provisioning controller may also run in a TEE, thus further improving the overall security of the software provisioning workflow.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
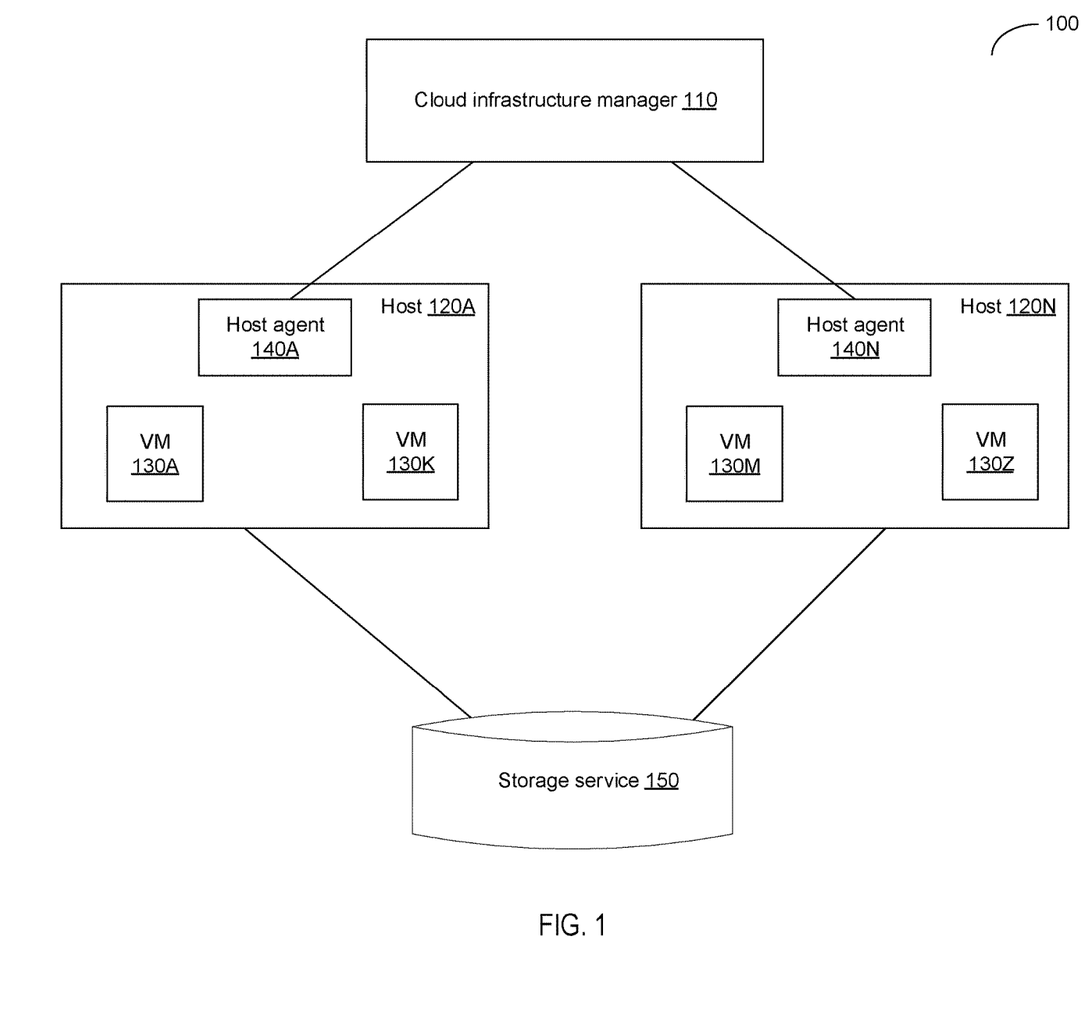
FIG. 1 schematically depicts a high-level component diagram of an example cloud environment 100 implemented in accordance with one or more aspects of the present disclosure.

FIG. 1 schematically depicts a high-level component diagram of an example cloud environment 100 implemented in accordance with one or more aspects of the present disclosure. As schematically illustrated by FIG. 1, the cloud environment 100 may be managed by the virtualization manger 110 which may provide a graphical user interface and a RESTful API to manage the cloud environment resources. In some implementations, the cloud infrastructure manager 110 may further perform the functions of a software provisioning controller operating in accordance with one or more aspects of the present disclosure.

The cloud environment 100 may further include one or more host computer systems 120A-120N, on which virtual machine instances 130A-130Z may run. Host agents 140A-140N may run as daemons on the respective hosts 120A-120N in order to manage and monitor the storage, memory and network resources of each host, as well as to facilitate communications of the host with the cloud infrastructure manager 110. In various implementations, the host agent may further co-ordinate virtual machine creation, statistics gathering, log collection and other host administration tasks. In some implementations, the host agent 140 may further perform the functions of a software provisioning agent operating in accordance with one or more aspects of the present disclosure.

The cloud infrastructure manager 110 may act as a client with respect to each host agent 140A-140N, and may communicate to the host agents 140A-140N via XML-RPC or any other suitable protocol. In some implementations, a transport layer security scheme (e.g., secure socket layer (SSL)) may be implemented for secure data and command transmission between the host agents 140, cloud infrastructure manager 110, and/or software repositories implemented by the shared storage service 150.

The shared storage service 150 may be implemented by one or more storage nodes, one or more container servers to manage mappings of object containers, one or more object servers to manage objects (such as files) on the storage nodes, and one or more authentication servers to manage accounts defined within the object storage service. In some implementations, the shared storage service may further implement one or more software repositories for storing virtual machine images, operating system code and metadata, application code and metadata, and/or software update code and metadata.

The cloud infrastructure manager 110 may manage deployment, configuration, and maintenance of the host computers and virtual machines. The functions of the cloud infrastructure manager 110 may include provisioning, remote management and monitoring of one or more cloud environments 100. The cloud infrastructure manager 110 may implement fine-grained life cycle management, user and group role-based access control, integrated subscription management, as well as advanced graphical user interface (GUI), command line interface (CLI), and/or API access.

While in the illustrative example of FIG. 1 the cloud infrastructure manager 110 is shown as running on a separate physical machine, in various alternative implementations the cloud infrastructure manager 110 may be collocated with one of the hosts 120A-120N.

Figure 2A:
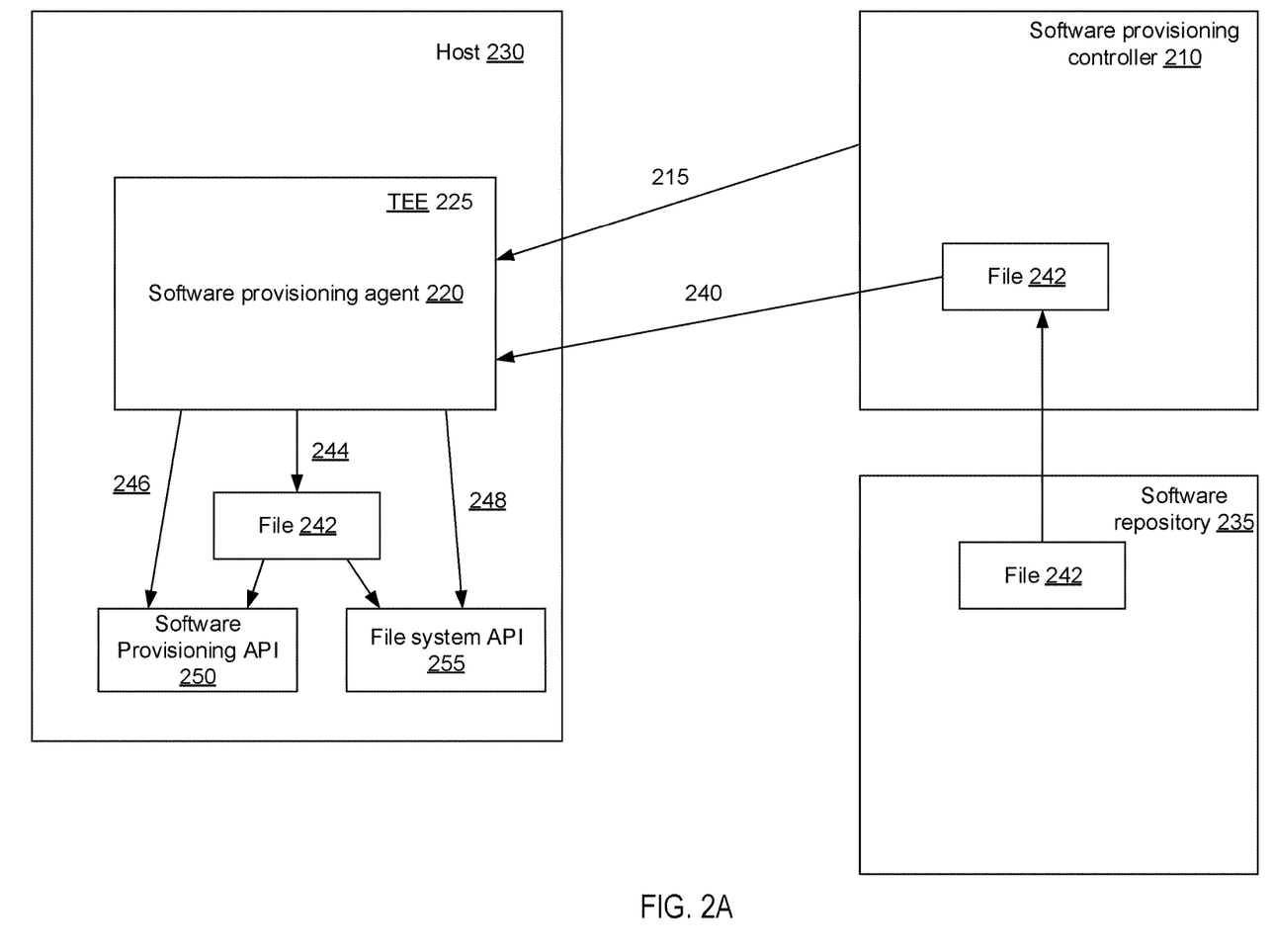
FIGS. 2A-2C schematically illustrate example software provisioning workflows performed by the TEE-resident software provisioning agents operating in accordance with one or more aspects of the present disclosure.

FIG. 2A schematically illustrates an example software provisioning workflow performed by a TEE-resident software provisioning agent operating in accordance with one or more aspects of the present disclosure. In an illustrative example, the software provisioning controller 210 may initiate a software provisioning operation by transmitting a software provisioning command 215 the software provisioning agent 220 residing in TEE 225 of the host computer system 230. The software provisioning command 215 may identify one or more software applications installed on the host 230. The software provisioning command 215 may further identify one or more software provisioning actions to be performed by the software provisioning agent 220 with respect to each of the identified software applications. The software provisioning command 215 may further comprise identifiers (e.g., uniform resource identifiers (URI)) of one or more files to be downloaded by the software provisioning agent 220 from the software provisioning controller 210 or from the software repository 235.

Responsive to receiving the software provisioning command 215, the software provisioning agent 220 may receive (operation 240) one or more files 242 containing the code and/or metadata for performing the software provisioning operations specified by the software provisioning command 215. In some implementations, the files may be encrypted, e.g., by a private key of the software provisioning controller 210 or the software repository 235. Accordingly, the software provisioning agent 220 may decrypt the received encrypted files using the public key of the software provisioning controller 210 or the software repository 235. Various other encryption schemes may be implemented by the systems and methods of the present disclosure.

The software provisioning agent 220 may store (operation 244) the decrypted files in a local file system of the host 220 and may then perform the software provisioning operation 245 (e.g., a software installation operation or a software update operation) specified by the software provisioning command 215. In an illustrative example, the software provisioning agent 220 may invoke (operation 246) one or more functions of the software provisioning API 250 implemented by the host computer system 230 and/or by virtual machines running on the host computer system 230. Identifiers of the received files in the local file system may be supplied as arguments to the invoked API functions. The host 230 and/or a virtual machine running on the host 230 may then access the file and perform the operations specified by the invoked API functions, the completing the software installation or update.

Alternatively, the software provisioning agent 220 may directly perform one or more file system operations on the host 230, e.g., by invoking (operation 248) one or more functions of the file system API 255 implemented by the host computer system. Identifiers of the received files in the local file system may be supplied as arguments to the invoked API functions.

Figure 2B:
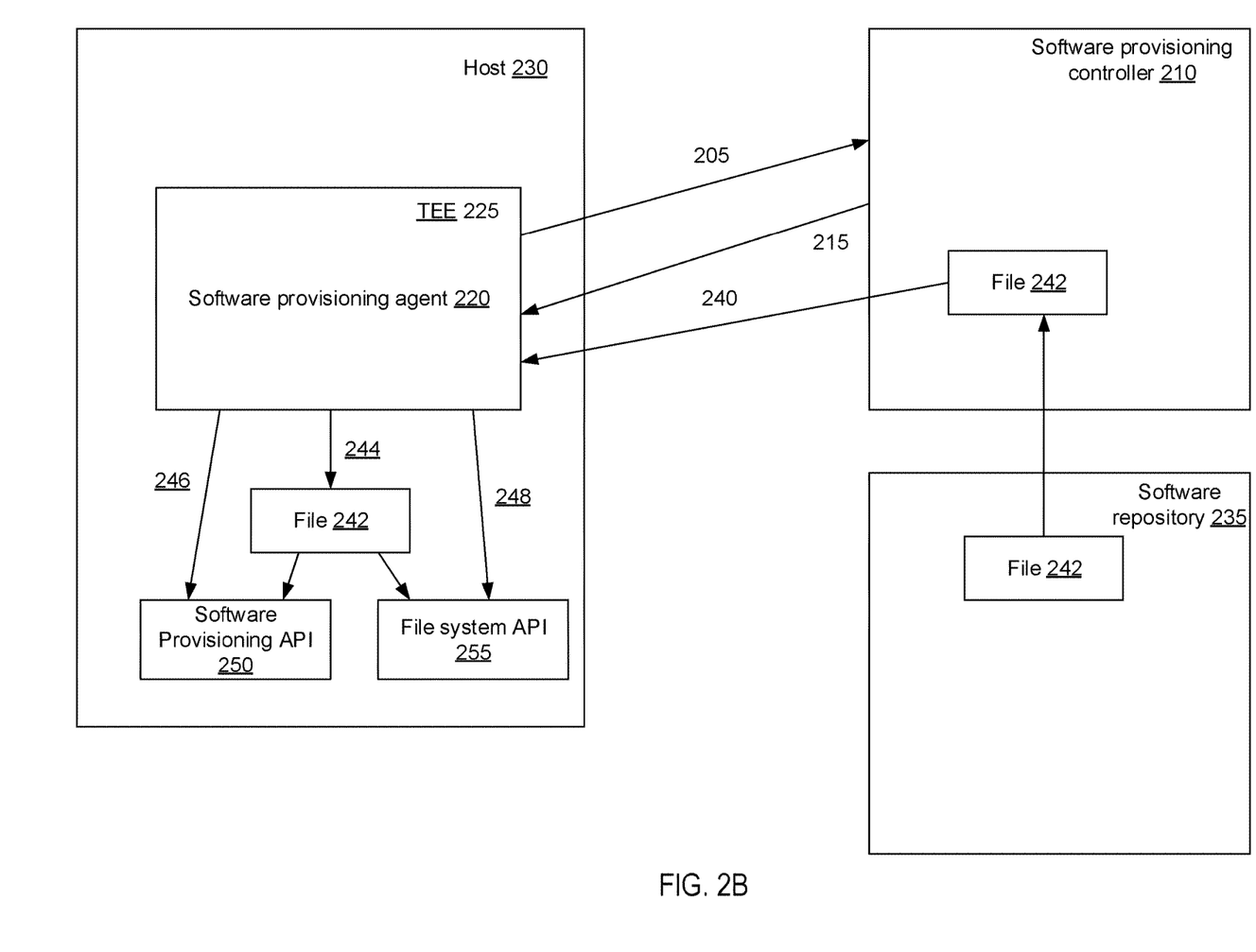

In another illustrative example, schematically illustrated by FIG. 2B, the software provisioning operation may be initiated by the software provisioning agent 220, which may, in order to perform an installation or an update of a software application running on the host 230 or on one or more virtual machines running on the host 230, transmit a software provisioning request 205 to the software provisioning controller 210. The software provisioning request 205 may identify one or more software applications installed on the host 230. The software provisioning request 205 may further identify one or more software provisioning actions to be performed by the software provisioning agent 220 with respect to each of the identified software applications.

The software provisioning controller 210 may reply to the software provisioning request 205 by transmitting a response comprising one or more software provisioning commands 215. Responsive to receiving the software provisioning command 215, the software provisioning agent 220 may receive one or more files 242 and may further perform the software provisioning operations specified by the software provisioning command 215, as described herein above with reference to FIG. 2A.

Figure 2C:
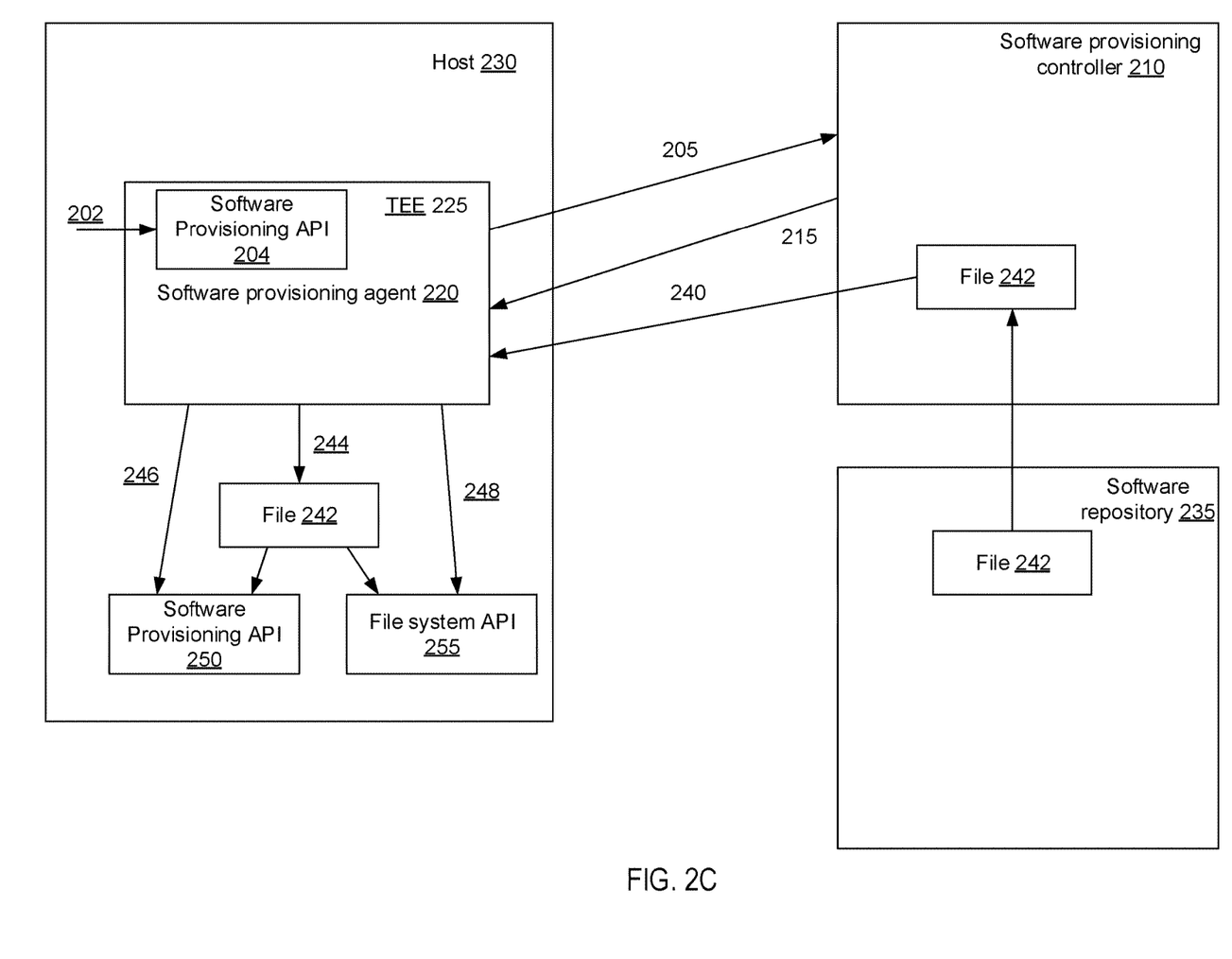

In another illustrative example, schematically illustrated by FIG. 2C, the software provisioning operation may be initiated by the host computer system 230, which may, in order to perform an installation or an update of a software application running on the host 230 or on one or more virtual machines running on the host 230, invoke (operation 202) a function of the software provisioning API 204 implemented by the software provisioning agent 220. The software provisioning agent 220 may initiate the requested software provisioning operation by transmitting a software provisioning request 205 to the software provisioning controller 210.

The software provisioning controller 210 may reply to the software provisioning request 205 by transmitting a response comprising one or more software provisioning commands 215. Responsive to receiving the software provisioning command 215, the software provisioning agent 220 may receive one or more files 242 and may further perform the software provisioning operations specified by the software provisioning command 215, as described herein above with reference to FIG. 2A.

Various other methods of performing software provisioning operations may be implemented by the systems and methods of the present disclosure.

Figure 3:
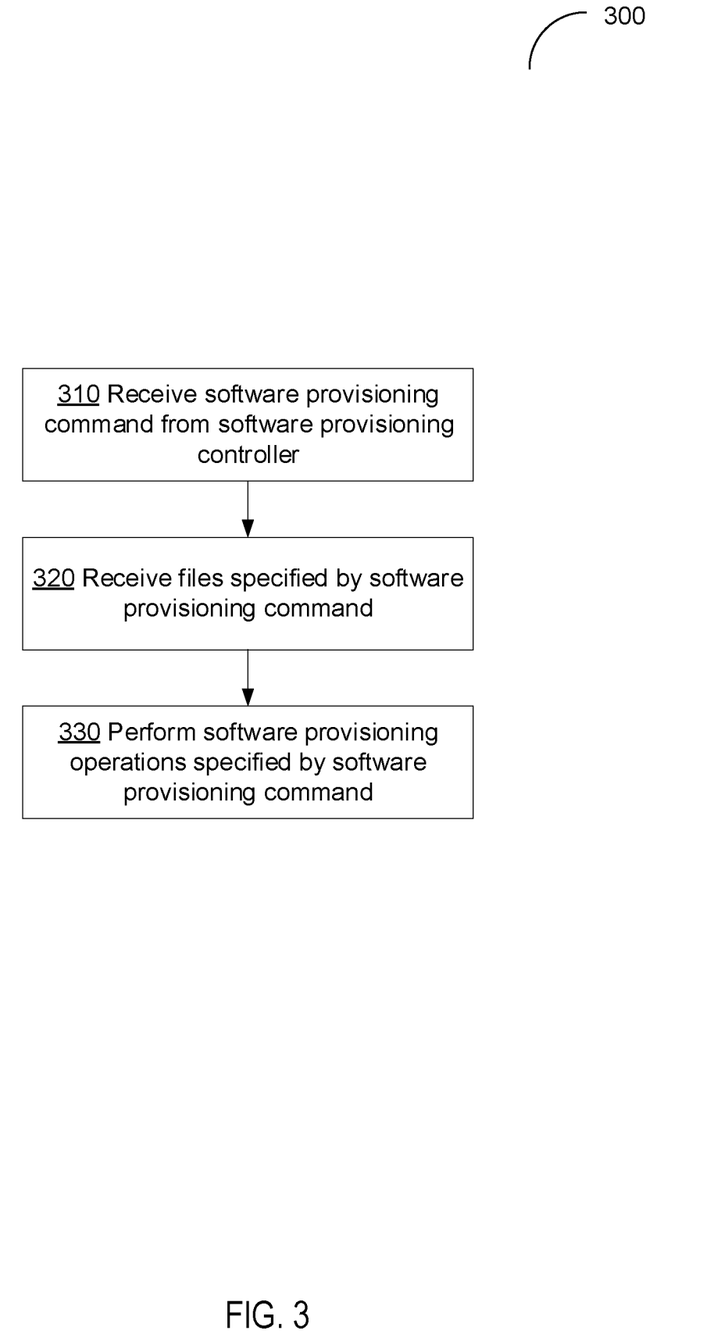
FIG. 3 depicts a flowchart of an example software provisioning method performed by the TEE-resident software provisioning agent operating in accordance with one or more aspects of the present disclosure.

FIG. 3 depicts a flowchart of an example software provisioning method 300 performed by the TEE-resident software provisioning agent, in accordance with one or more aspects of the present disclosure. In some implementations, method 300 may be performed by a single processing thread executed by a processing device. Alternatively, method 300 may be performed by two or more processing threads executed by one or more processing devices, such that each thread would execute one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel and/or in arbitrary selected orders.

At block 310, a software provisioning agent implementing the method may receive, from the software provisioning controller, a software provisioning command identifying one or more software applications installed on the host computer system serviced by the software provisioning agent. The software provisioning command may further identify one or more software provisioning actions to be performed by the software provisioning agent with respect to each of the identified software applications. The software provisioning command may identify one or more files to be downloaded by the software provisioning agent from the software provisioning controller or from a software repository, as described in more detail herein above.

At block 320, the software provisioning agent may retrieve, from the software provisioning controller and/or from the software repository specified by the software provisioning command, the files specified by the software provisioning command. The software provisioning agent may decrypt the received encrypted files and may store the decrypted files in a local file system of the host computer system, as described in more detail herein above.

At block 330, the software provisioning agent may perform the software provisioning operations specified by the software provisioning command. In an illustrative example, the software provisioning agent may invoke or more functions of the software provisioning API implemented by the host computer system and/or by virtual machines running on the host computer system. Alternatively, the software provisioning agent may directly perform one or more file system operations on the host computer system, e.g., by invoking one or more functions of the file system API 255 implemented by the host computer system, as described in more detail herein above.

Upon completing the operations of block 330, the method may terminate.

Figure 4:
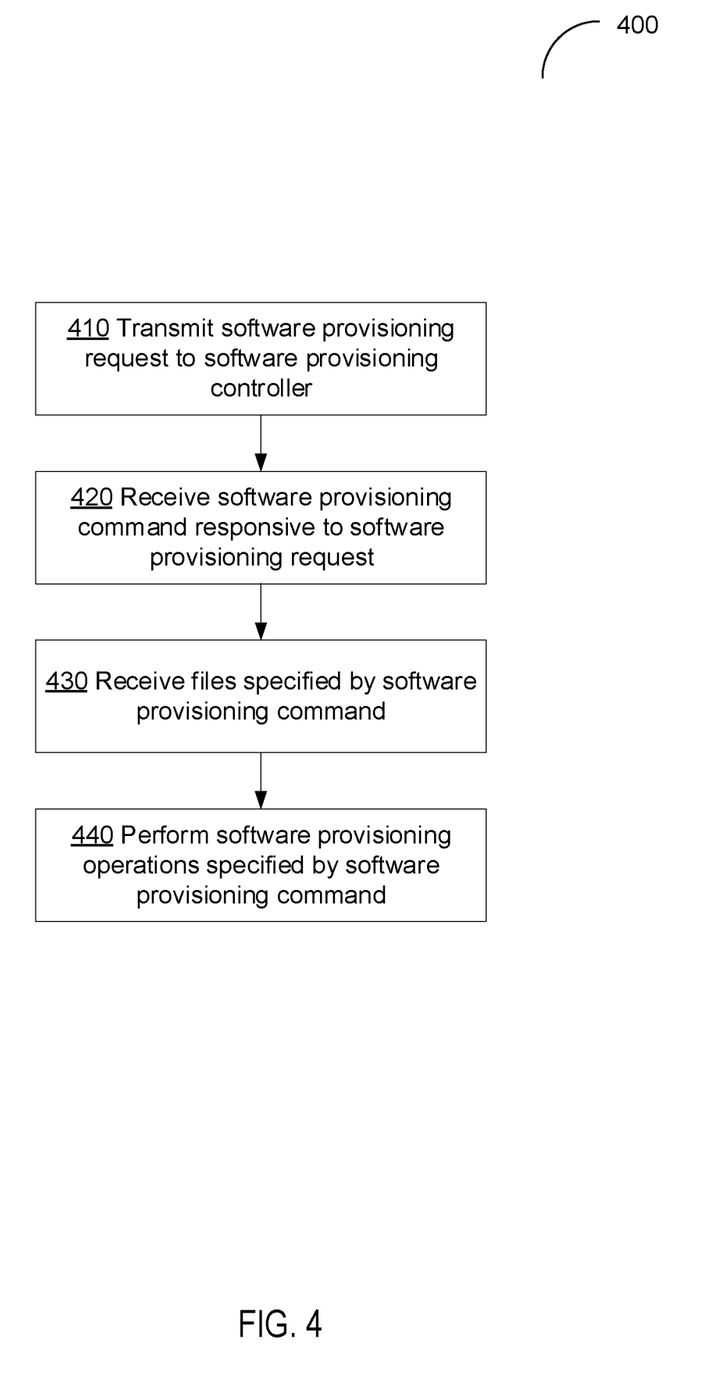
FIG. 4 depicts a flowchart of another example software provisioning method performed by the TEE-resident software provisioning agent operating in accordance with one or more aspects of the present disclosure.

FIG. 4 depicts a flowchart of another example software provisioning method 400 performed by the TEE-resident software provisioning agent, in accordance with one or more aspects of the present disclosure. In some implementations, method 400 may be performed by a single processing thread executed by a processing device. Alternatively, method 400 may be performed by two or more processing threads executed by one or more processing devices, such that each thread would execute one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

At block 410, a software provisioning agent implementing the method may transmit, to the software provisioning controller, a software provisioning request identifying one or more software applications installed on the host computer system serviced by the software provisioning agent. The software provisioning request may further identify one or more software provisioning actions to be performed by the software provisioning agent with respect to each of the identified software applications.

At block 420, the software provisioning agent may receive, from the software provisioning controller, a software provisioning command responsive to the software provisioning request. The software provisioning command may identify one or more files to be downloaded by the software provisioning agent from the software provisioning controller or from a software repository, as described in more detail herein above.

At block 430, the software provisioning agent may retrieve, from the software provisioning controller and/or from the software repository specified by the software provisioning command, the files specified by the software provisioning command. The software provisioning agent may decrypt the received encrypted files and may store the decrypted files in a local file system of the host computer system, as described in more detail herein above.

At block 440, the software provisioning agent may perform the software provisioning operations specified by the software provisioning command. In an illustrative example, the software provisioning agent may invoke or more functions of the software provisioning API implemented by the host computer system and/or by virtual machines running on the host computer system. Alternatively, the software provisioning agent may directly perform one or more file system operations on the host computer system, e.g., by invoking one or more functions of the file system API 255 implemented by the host computer system, as described in more detail herein above.

Upon completing the operations of block 440, the method may terminate.

Figure 5:
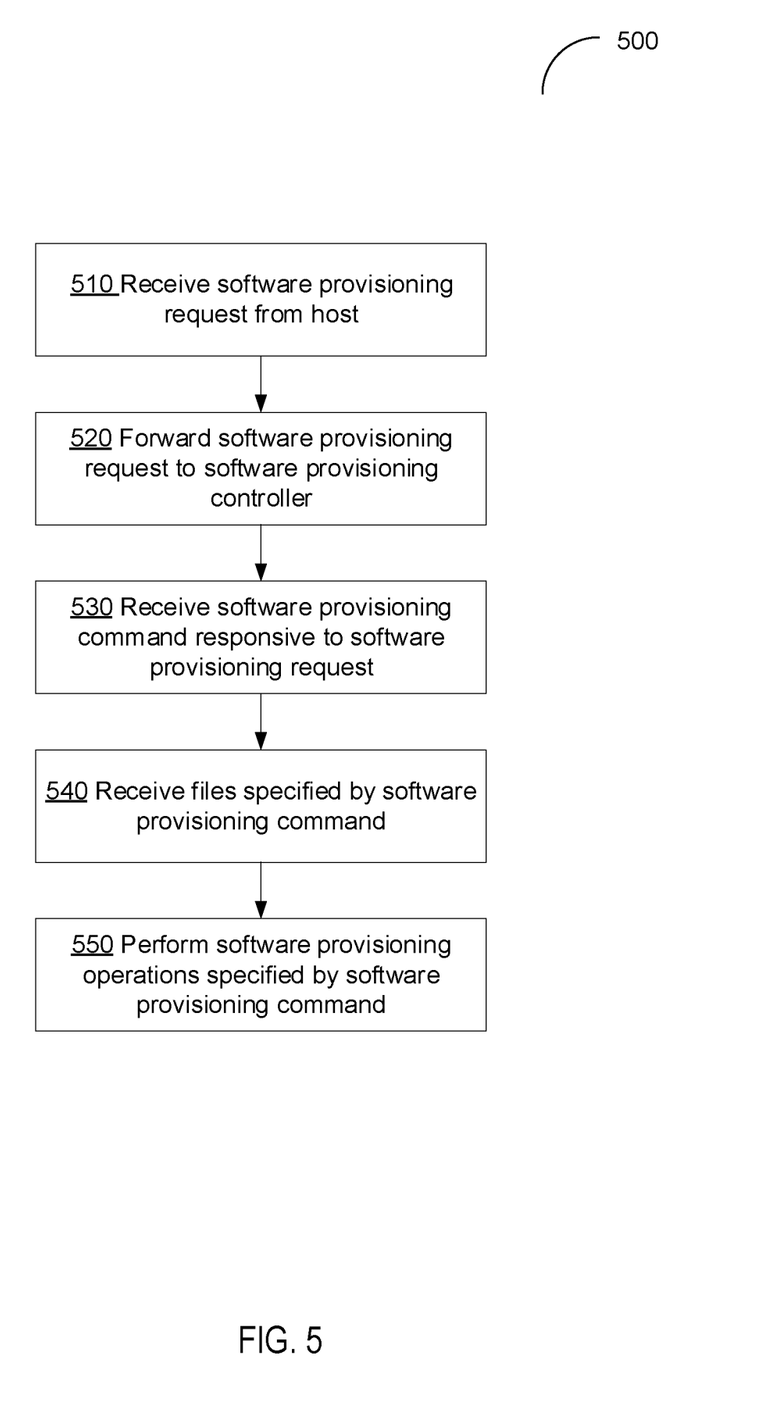
FIG. 5 depicts a flowchart of another example software provisioning method performed by the TEE-resident software provisioning agent operating in accordance with one or more aspects of the present disclosure.

FIG. 5 depicts a flowchart of another example software provisioning method 500 performed by the TEE-resident software provisioning agent, in accordance with one or more aspects of the present disclosure. In some implementations, method 500 may be performed by a single processing thread executed by a processing device. Alternatively, method 500 may be performed by two or more processing threads executed by one or more processing devices, such that each thread would execute one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel and/or in arbitrary selected orders.

At block 510, a software provisioning agent implementing the method may receive, from the host computer system, a software provisioning request identifying one or more software applications installed on the host computer system serviced by the software provisioning agent. The software provisioning request may further identify one or more software provisioning actions to be performed by the software provisioning agent with respect to each of the identified software applications.

At block 520, the software provisioning agent implementing the method may forward the software provisioning request to the software provisioning controller, as described in more detail herein above.

At block 530, the software provisioning agent may receive, from the software provisioning controller, a software provisioning command responsive to the software provisioning request. The software provisioning command may identify one or more files to be downloaded by the software provisioning agent from the software provisioning controller or from a software repository, as described in more detail herein above.

At block 540, the software provisioning agent may retrieve, from the software provisioning controller and/or from the software repository specified by the software provisioning command, the files specified by the software provisioning command. The software provisioning agent may decrypt the received encrypted files and may store the decrypted files in a local file system of the host computer system, as described in more detail herein above.

At block 550, the software provisioning agent may perform the software provisioning operations specified by the software provisioning command. In an illustrative example, the software provisioning agent may invoke or more functions of the software provisioning API implemented by the host computer system and/or by virtual machines running on the host computer system. Alternatively, the software provisioning agent may directly perform one or more file system operations on the host computer system, e.g., by invoking one or more functions of the file system API 255 implemented by the host computer system, as described in more detail herein above.

Upon completing the operations of block 550, the method may terminate.

Figure 6:
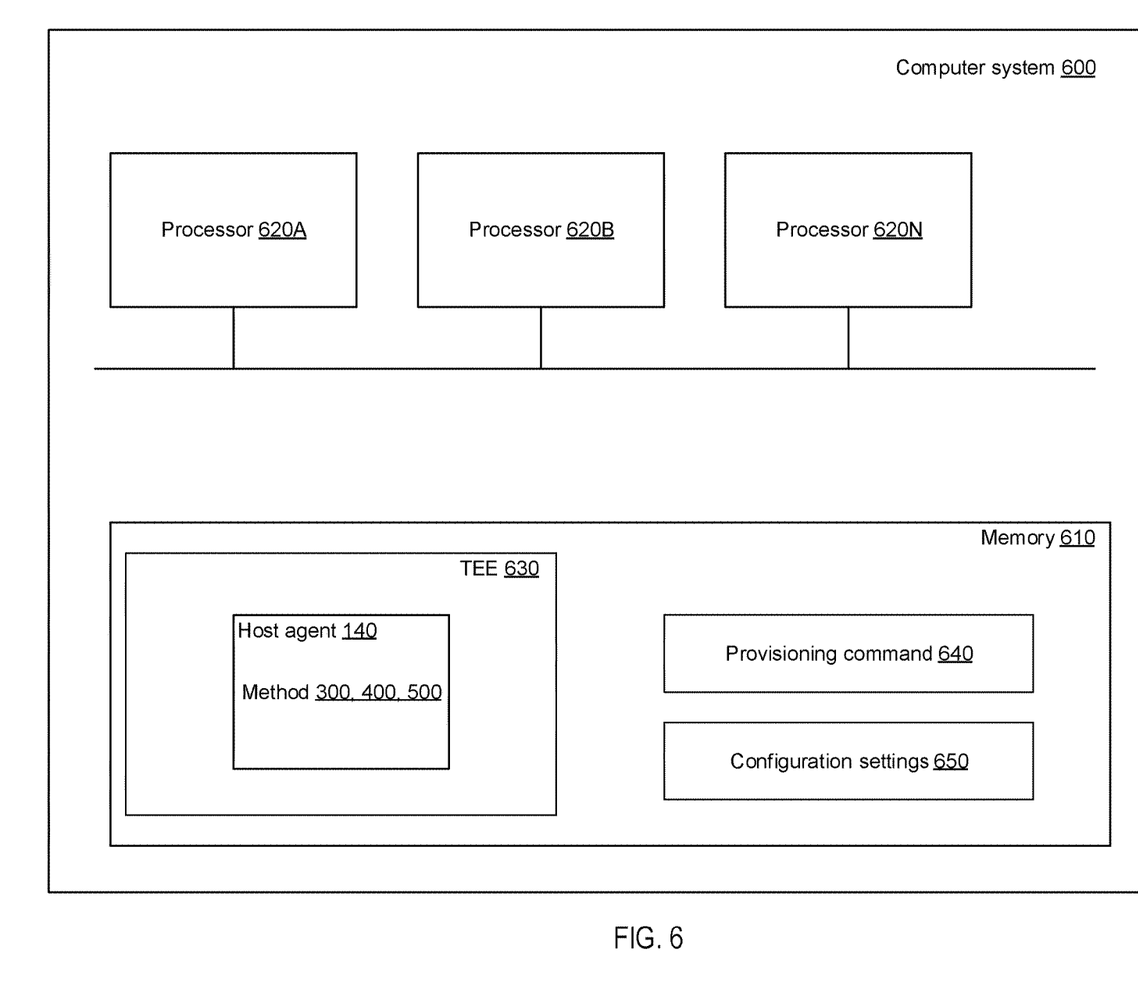
FIG. 6 depicts a high-level component diagram of an example computer system, which may be employed to implement the systems and methods described herein.

FIG. 6 depicts a block diagram of an illustrative computer system 600 operating in accordance with one or more aspects of the disclosure. In various implementations, computer system 1000 may perform the functions of to the host computer system 120 of FIG. 1. Computer system 600 comprises a memory 610 and one or more physical processors 620A-620N, that are operatively coupled to the memory 610 and execute, within the TEE 630, the code implementing the software provisioning methods 300, 400 and/or 500. The memory 610 may further store one or more software provisioning commands 640 and/or various configuration settings 650, as described in more details herein above.

Figure 7:
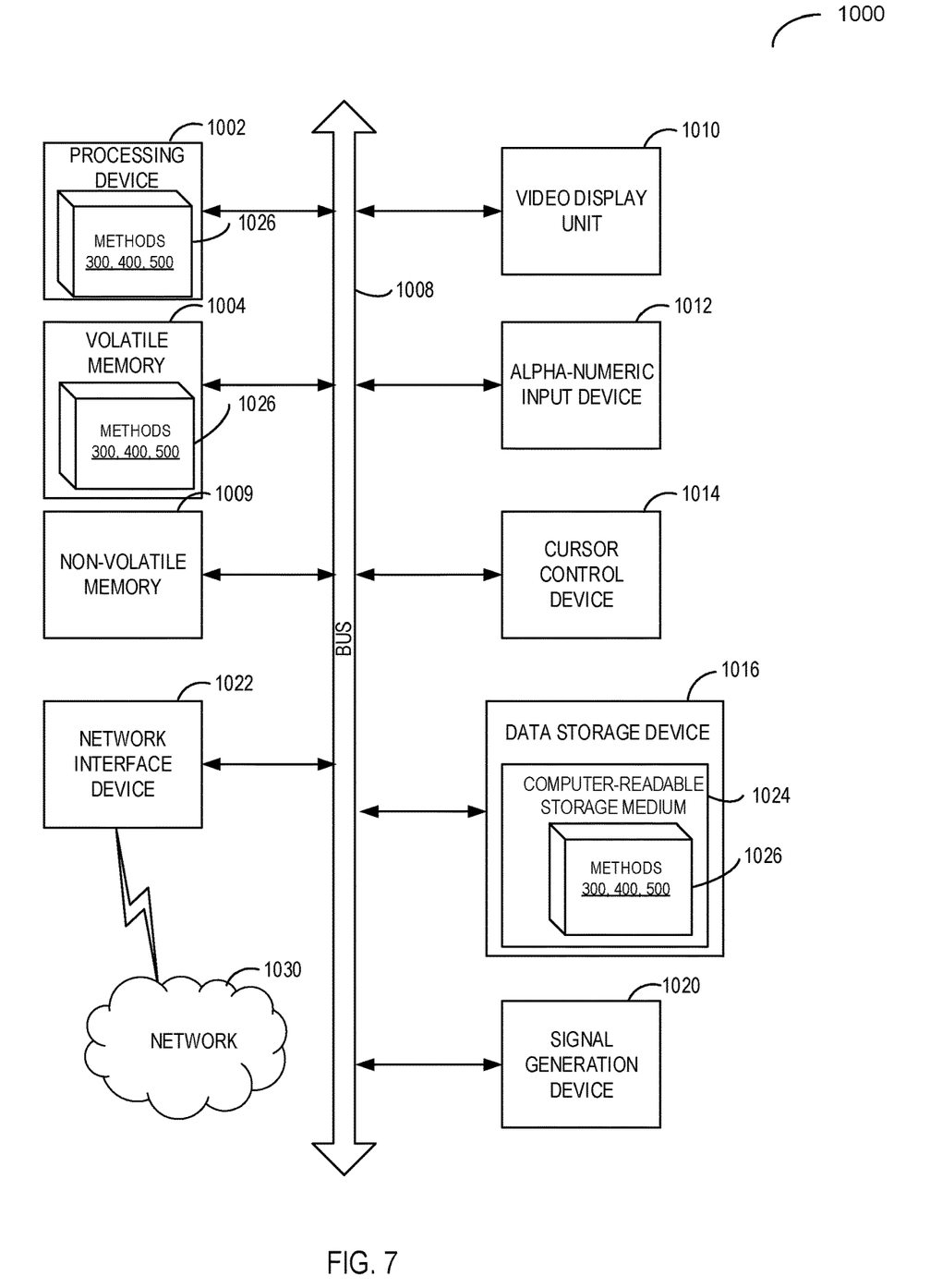
FIG. 7 depicts a high-level component diagram of another example computer system, which may be employed to implement the systems and methods described herein.

FIG. 7 depicts a high-level component diagram of an example computer system which may be employed to implement the systems and methods described herein. In various implementations, computer system 1000 may perform the functions of host computer system 120 of FIG. 1. In some implementations, computer system 1000 may be connected (e.g., via a network 1030, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1009 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing methods 300, 400 and/or 500 of implementing a software provisioning agent residing in a TEE.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
receiving, via a software provisioning application programming interface (API) implemented by a software provisioning agent residing in a first trusted execution environment (TEE) executing on a computer system, a software provisioning request initiated by a virtual machine running on the computer system, wherein the software provisioning request identifies a target software application;
forwarding, by the software provisioning agent, the software provisioning request to a software provisioning controller managing software provisioning in a cloud environment that includes the computer system, wherein the software provisioning controller comprises a second TEE;
receiving, by the software provisioning agent, a software provisioning command from the software provisioning controller, wherein the software provisioning command identifies the target software application, a uniform resource identifier (URI) of a file associated with the target software application, and a software provisioning operation to be performed with respect to the target software application;
receiving the file identified by the URI; and
performing, using the file, the software provisioning operation specified by the software provisioning command.

2. The method of claim 1, wherein the file is received from the software provisioning controller.

3. The method of claim 1, wherein the file is received from a software repository.

4. The method of claim 3, wherein the software repository is identified by the software provisioning command.

5. The method of claim 1, wherein the file is encrypted using a first cryptographic key, and wherein receiving the file further comprises:
  decrypting the file using a second cryptographic key, wherein the first cryptographic key and the second cryptographic key are generated by applying a cryptographic operation to a secret value.

6. The method of claim 1, wherein receiving the software provisioning command is performed responsive to transmitting the software provisioning request to the software provisioning controller.

7. The method of claim 1, wherein performing the software provisioning operation further comprises at least one of: installing the target software application or updating the target software application.

8. The method of claim 1, wherein performing the software provisioning operation further comprises:
  invoking a function defined by a software provisioning application programming interface (API) of the host computer system.

9. The method of claim 1, wherein performing the software provisioning operation further comprises:
  causing a file operation using the file to be performed by a file system of the host computer system.

10. A computer system, comprising:
  a memory; and
  a processing device, coupled to the memory, to implement a software provisioning agent residing in a first trusted execution environment (TEE);
  wherein the software provisioning agent is to:
    receive, via a software provisioning application programming interface (API) implemented by the software provisioning agent, a software provisioning request initiated by a virtual machine executed by the processing device, wherein the software provisioning request identifies a target software application;
    forward the software provisioning request to a software provisioning controller managing software provisioning in a cloud environment, wherein the software provisioning controller comprises a second TEE;
    receive a software provisioning command responsive to the software provisioning request, wherein the software provisioning command identifies a uniform resource identifier (URI) of a file associated with the target software application and a software provisioning operation to be performed with respect to the target software application;
    receive the file identified by the URI; and
    perform, using the file, the software provisioning operation specified by the software provisioning command.

11. The system of claim 10, wherein the file is encrypted using a first cryptographic key, and wherein receiving the file further comprises:
  decrypting the file using a second cryptographic key, wherein the first cryptographic key and the second cryptographic key are generated by applying a cryptographic operation to a secret value.

12. The system of claim 10, wherein performing the software provisioning operation further comprises at least one of: installing the target software application using the file or updating the target software application using the file.

13. The system of claim 10, wherein performing the software provisioning operation further comprises:
  invoking a function defined by a software provisioning application programming interface (API) of the host computer system.

14. The system of claim 10, wherein performing the software provisioning operation further comprises:
  causing a file operation using the file to be performed by a file system of the host computer system.

15. A non-transitory computer-readable storage medium comprising executable instructions that, when executed by a host computer system residing in a cloud environment, cause the host computer system to implement a software provisioning agent residing in a first trusted execution environment (TEE), wherein the software provisioning agent is to:
  receive, via a software provisioning application programming interface (API) implemented by the software provisioning agent, a software provisioning request initiated by a virtual machine running on the host computer system, wherein the software provisioning request identifies a target software application;
  forward the software provisioning request to a software provisioning controller managing software provisioning in the cloud environment that includes the host computer system, wherein the software provisioning controller comprises a second TEE;
  receive a software provisioning command responsive to the software provisioning request wherein the software provisioning command identifies a uniform resource identifier (URI) of a file associated with the target software application and a software provisioning operation to be performed with respect to the target software application;
  receive the file identified by the URI; and
  perform, using the file, the software provisioning operation specified by the software provisioning command.

16. The non-transitory computer-readable storage medium of claim 15, wherein the file is encrypted using a first cryptographic key, and wherein receiving the file further comprises:
  decrypting the file using a second cryptographic key, wherein the first cryptographic key and the second cryptographic key are generated by applying a cryptographic operation to a secret value.

17. The non-transitory computer-readable storage medium of claim 15, wherein performing the software provisioning operation further comprises:
  invoking a function defined by a software provisioning application programming interface (API) of the host computer system.

18. The non-transitory computer-readable storage medium of claim 15, wherein performing the software provisioning operation further comprises:
  causing a file operation using the file to be performed by a file system of the host computer system.

* * * * *